(12) United States Patent
Grayson (10) Patent No.: US 7,142,095 B1
(45) Date of Patent: *Nov. 28, 2006

(54) DETECTABLE WARNING SYSTEM

(76) Inventor: Thomas Grayson, 510 N. Hampton St., Anaheim, CA (US) 92801

( * ) Notice: Subject to any disclaimer, the term of this patent is extended or adjusted under 35 U.S.C. 154(b) by 193 days.

This patent is subject to a terminal disclaimer.

(21) Appl. No.: 10/888,758

(22) Filed: Jul. 9, 2004

Related U.S. Application Data

(63) Continuation-in-part of application No. 10/716,155, filed on Nov. 18, 2003, now Pat. No. 6,960,989.

(51) Int. Cl.
*H04B 3/36* (2006.01)
*G08G 1/095* (2006.01)

(52) U.S. Cl. ............... 340/407.1; 340/907; 340/691.1; 404/18

(58) Field of Classification Search ............. 340/407.1, 340/907, 691.1, 825.19; 404/18, 27, 28, 404/29, 30, 34, 35, 36
See application file for complete search history.

(56) References Cited

U.S. PATENT DOCUMENTS 5,835,271 A * 11/1998 Stump et al. ............... 359/529

* cited by examiner

*Primary Examiner*—Daryl C Pope
(74) *Attorney, Agent, or Firm*—Goldstein Law Offices P.C.

(57) ABSTRACT

A detectable warning system, for tactily signaling the presence of a terrain transition to a pedestrian, using a plurality of detectable warning domes that are arranged in a grid within a detectable warning carrier assembly. The detectable warning carrier assembly comprises a carrier layer being one of a top layer and a base layer of thermoplastic material with heat resistant detectable warning domes therebetween. The carrier layer is heated and adhered to a pavement surface. The detectable warning domes protrude from the pavement surface in an evenly spaced pattern that is detectable by the pedestrian using a cane or other guidance instrument.

16 Claims, 6 Drawing Sheets

DETECTABLE WARNING SYSTEM

CROSS REFERENCES AND RELATED SUBJECT MATTER

This application is a continuation-in-part of patent application Ser. No. 10/716,155, filed in the United States Patent Office on Nov. 18, 2003 now U.S. Pat. No. 6,960,989.

BACKGROUND OF THE INVENTION

The invention relates to a detectable warning system. More particularly, the invention relates to a system for easily and effectively applying prefabricated detectable warnings to pavement to provide a tactile warning to pedestrians regarding a hazardous transition.

It is well known that persons with little or no usable vision depend upon environmental cues—ambient sounds, edges and other physical elements that can be sensed by a cane, and texture changes underfoot—for safe and independent travel. People with low vision can also use color contrast as a navigation aid. When raised curbs do not mark and separate the pedestrian route on a sidewalk from the vehicular way, as at curb ramps, vehicle drop-offs, or depressed corners at intersections, it is difficult for some pedestrians to discern the boundary between pedestrian safety and hazard.

Because of the inherent danger caused by transitions without textural changes, the Americans with Disabilities Act Accessibility Guidelines (ADAAG) requires that detectable warnings be installed onto pavement or ground surfaces at certain hazardous junctures. The detectable warnings provide a contrasting texture that signals a hazardous condition to the pedestrian, and thereby informs the pedestrian to exercise care. In particular, the current regulation requires that the detectable warning consist of truncated domes having a nominal diameter of 0.9 inches, protruding from the ground surface to a height of 0.2 inches, and having a center-to-center spacing of 2.35 inches. In addition, the warning should be of contrasting color to effectively warn those who have greatly reduced vision.

In many cases, the warnings must be retrofitted onto existing ground surfaces. Further, the installation of such warnings is not readily compatible with standard paving techniques. Accordingly, the detectable warnings are most typically installed onto already existing pavement surfaces.

Some have proposed systems for the creation and installation of the domes. Generally these systems involve the use of templates to create the dome "in place". Others have proposed systems of prefabricated warning domes. For example, TOPMARK proposes a system of preformed thermoplastic detectable warnings that is installed in sheets that have a plurality of thermoplastic domes. Unfortunately, the use of thermoplastic warning domes makes the system extremely difficult to install, since heat must be used to install the sheets, but heat will deform or destroy the thermoplastic domes.

My previous patent application described a system wherein warning domes are encapsulated between a top layer and a base layer of thermoplastic. The present invention contemplates a single attachment layer that both maintains the warning domes in position and adheres the dome carrier assembly to the recipient pavement surface.

While these units may be suitable for the particular purpose employed, or for general use, they would not be as suitable for the purposes of the present invention as disclosed hereafter.

SUMMARY OF THE INVENTION

It is an object of the invention to provide a system for allowing the effective installation of detectable warnings upon a pavement surface using heat, wherein the warning domes are not harmed during application to said pavement surface. Accordingly, the detectable warnings are made of a heat resistant casting material that is joined to a layer of thermoplastic. The thermoplastic allows the warnings to be effectively mounted and evenly distributed on the pavement surface.

It is another object of the invention to provide a system for allowing the easy fabrication of detectable warning dome carriers for quick and easy subsequent installation of a plurality of domes simultaneously. Accordingly, by a first embodiment, a mold is used to initially create a top layer of thermoplastic material and create the detectable warning domes thereupon. Upon removal from the mold, the detectable warning dome carriers may be easily adhered to pavement surfaces by the application of heat. In particular, the thermoplastic top layer drapes over the domes and adheres to the pavement surface. The domes themselves also rest upon the pavement surface but are held thereagainst by the top layer. Further, by a second embodiment, a mold is used to initially create the detectable warning domes, and then create a base layer thereupon within which the warning domes are adhered and partially submerged. The base layer is adhered to the pavement surface and secures the domes thereonto.

The invention is a detectable warning system, for tactily signaling the presence of a terrain transition to a pedestrian, using a plurality of detectable warning domes that are arranged in a grid within a detectable warning carrier assembly. The detectable warning carrier assembly comprises heat resistant detectable warning domes and an attachment layer that may be one of a top layer and a base layer. The attachment layer is heated and adhered to a pavement surface. The detectable warning domes protrude from the pavement surface in an evenly spaced pattern that is detectable by the pedestrian using a cane or other guidance instrument.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

In the present application, both a first embodiment and second embodiment of the detachable warning carrier assembly, 101 and 102, are presented. FIGS. 1–6 illustrate the first embodiment, and FIGS. 7–11 illustrate the second embodiment. Each of the embodiments include an attachment layer of thermoplastic material.

Figure 1:
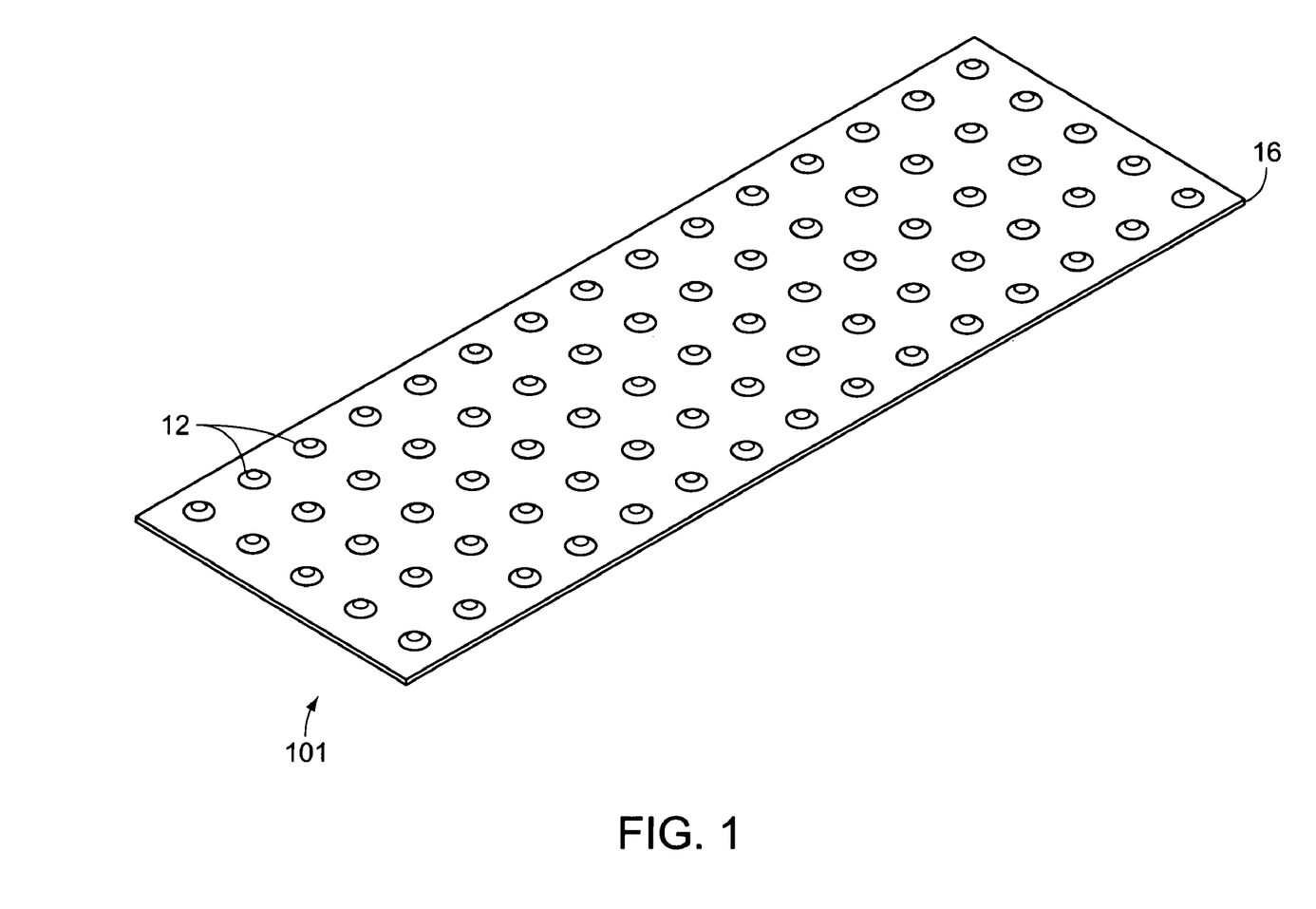
FIG. 1 is a diagrammatic perspective view illustrating a first embodiment of a detectable warning carrier assembly, having a plurality of detectable warning domes below a top layer of thermoplastic.

FIG. 1 illustrates a first embodiment of a detectable warning carrier assembly 101 comprising a plurality of detectable warning domes 12 arranged in an evenly spaced, grid-like pattern, and covered beneath a top layer 16. The top layer 16 is the attachment layer in the first embodiment. The carrier assembly 101 is substantially planar in between detectable warning domes 12. The domes 12 are preferably truncated, such that they are flattened on top.

To facilitate proper application of the detectable warning carrier assembly 101, the top layer 16 is preferably made of thermoplastic. The use of thermoplastic allows the top layer 16 to melt so as to conform to the contours of the recipient surface, and to effectively bond with said recipient surface by flowing into cracks and pores present thereon.

Figure 2:
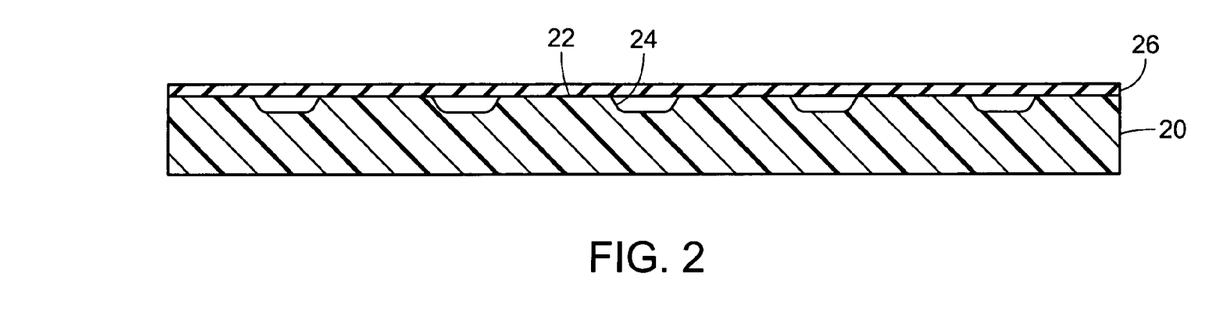
FIG. 2 is a cross sectional view of a mold used in the creation of the detectable warning carrier assembly, wherein a thermoplastic sheet has been placed to span the mold and extend across a plurality of dome forming cavities.

Referring to FIG. 2, formation of the first embodiment of the detectable warning carrier assembly centers upon a mold 20 having a top surface 22 and a plurality of dome forming cavities 24 extending downwardly from the top surface 22. The dome forming cavities 24 are shaped like inverted truncated warning domes and are spaced apart as required by regulations such as ADAAG 4.29.2, and to otherwise function as an effective detectable warning. The dome forming cavities 24 are dimensionally modified to accommodate a coating of thermoplastic as will be apparent hereinafter.

A first sheet of thermoplastic 26 is illustrated extending across the top surface 22, spanning the mold 20, and thereby extending across all dome forming cavities 24. The first sheet of thermoplastic 26 may actually be numerous sheets of thermoplastic that are adjacent and/or overlap each other so that they together substantially span the top surface 22 of the mold 20.

Figure 3:
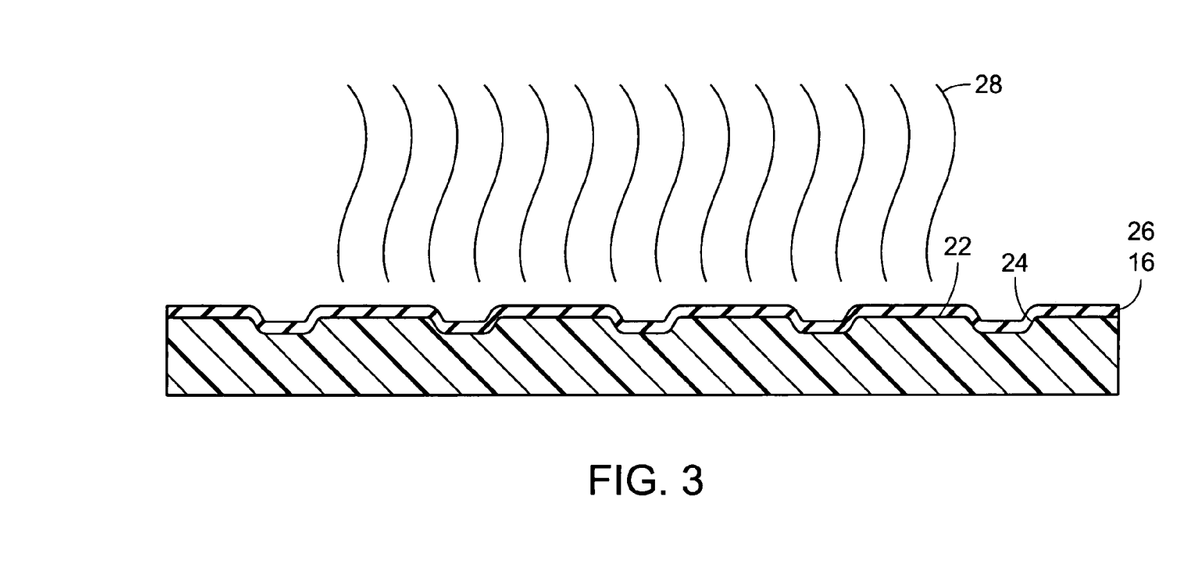
FIG. 3 is a cross sectional view similar to FIG. 2, except wherein heat is applied to melt the thermoplastic sheet so that it conforms to contours of the mold.

Referring now to FIG. 3, heat 28 is applied to the thermoplastic sheet 26 to a temperature sufficient to substantially melt the first sheet of thermoplastic, so that it forms a one-piece, continuous, top layer 16 of the detectable warning carrier assembly 101 being formed. Accordingly the top layer 16 flows into the dome forming cavities 24 where it conforms to the mold 20, taking the shape of the dome forming cavities 24, and spanning the top surface 22 with one continuous piece. The top layer 16, however, is substantially thin, and thus does not fill the dome forming cavities 24, nor does it substantially obscure the topography thereof.

Figure 4:
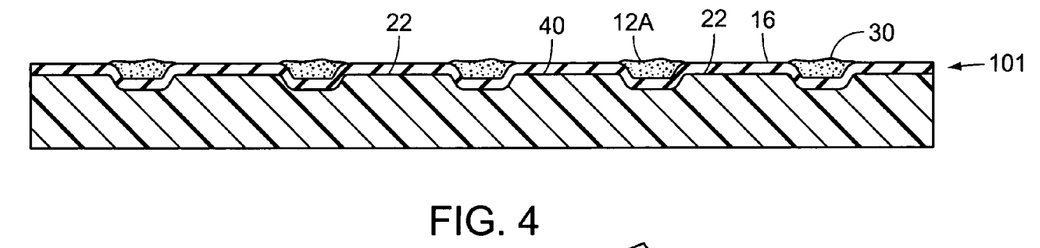
FIG. 4 is a cross sectional view, similar to FIG. 3, except wherein a heat resistant casting material has been added to the mold to form detectable warning domes within the dome forming cavities.
Figure 6:
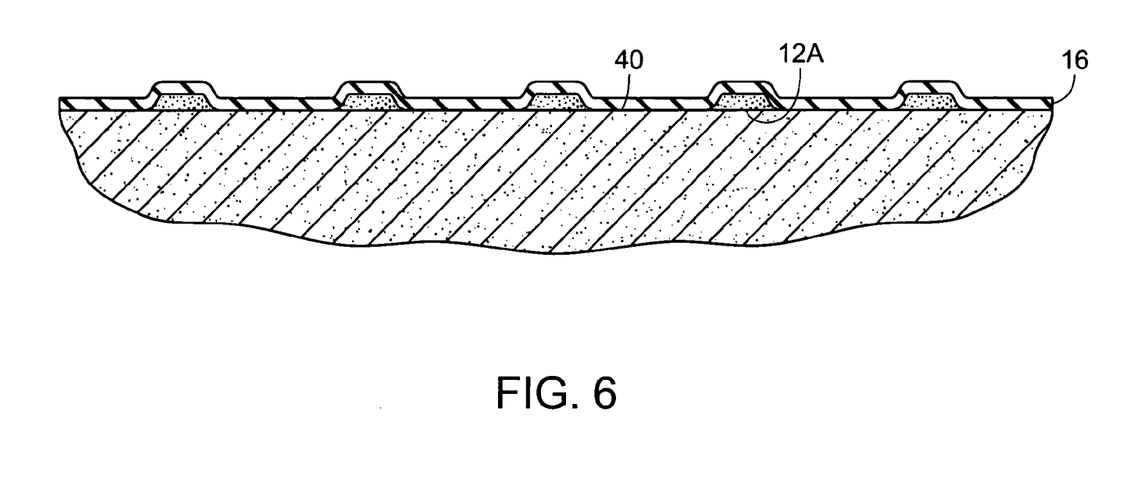
FIG. 6 is a cross sectional view of the detectable warning carrier assembly installed on the pavement surface, as indicated by line 6—6 in FIG. 5, showing the domes resting upon the pavement surface and the top layer adhered to the pavement around the domes, holding the domes securely against the pavement surface.

Referring now to FIG. 4, heat resistant casting material 30 has been added to substantially fill each of the dome forming cavities 24. In particular, the dome forming cavities 24 have been filled to a height substantially equivalent to the top surface 22, or more particularly—to substantially the height of the top layer 16 as it extends across the top surface 22. The heat resistant casting material is flowable but settable, hardens in time, and is preferably a masonry material such as concrete. Note that the casting material is shown as uneven at its uppermost surface—this is to emphasize its flowability and viscosity. The casting material will, however, settle and form a substantially flat dome base surface 12A, as seen in FIG. 6. Preferably the dome base surface 12A is substantially coplanar with the top layer 16. Note that prior to the addition of the casting material, sand may optionally be sprinkled into the mold, while the thermoplastic is still hot, to adhere to the not-yet-cured top layer. Such sand may be added to facilitate a strong bond between the casting material and the thermoplastic top layer. Alternatively, formable heat resistant plastic, such as thermosetting plastic, may be introduced into the mold to form the domes. Once set, such plastic will resist subsequent melting, but may melt slightly on the surface sufficient to establish a strong bond between the dome and top layer 16. In general, a variety of heat resistant materials can be used for the domes 12, including chemical compounds, mixtures, resins, polymers, glass, organic or inorganic substances, metals or other materials that have heat resistant properties. An important parameter of the heat resistant casting material is that it can resist temperatures of approximately 300–500 degrees Fahrenheit, so as to endure the bonding process that will be subsequently described.

If additional strength is desired, a strengthening grid, such as a mesh material, can be introduced at this point. Accordingly, such a mesh grid can be placed upon the top layer 16 so that it substantially spans the mold, and adheres to all domes. The additional strength provided by the strengthening grid helps make the invention more suitable for use on a surface where vehicles or other heavy equipment might be used.

In this regard, rather than casting the domes in place, performed domes can be introduced into the mold, with or without a pre-existing mesh grid holding a plurality of domes together. For example, the domes may be injection molded in a group, wherein members that connect the domes together are simultaneously formed during the injection molding process. The entire grouping of domes can then be placed within the dome forming cavities with the connecting members extending parallel to the top surface 22 of the mold 20. In such a case, the domes are made of a heat resistant plastic material. In addition, a plurality of domes can be joined and mounted upon a veneer of brick or other earthen material. The domes and veneer are then placed into the mold, with the domes resting against the top layer 16 within the dome forming cavities. The domes and veneer (along with adjacent veneers holding their own domes) are then adhered to the thermoplastic material by any suitable means.

Figure 5:
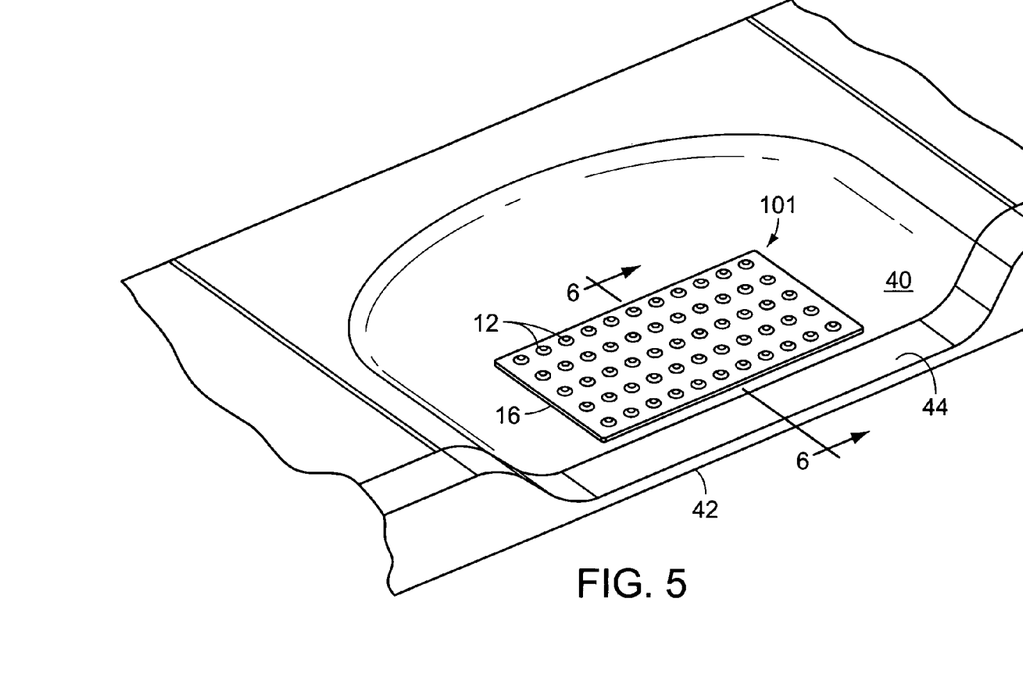
FIG. 5 diagrammatic perspective view illustrating the first embodiment of the invention installed onto a pavement surface.

Referring now to FIG. 5, to install the detectable warning carrier assembly 101, the top layer 16 is placed upon a pavement surface 40 near a hazardous transition point 42, which also places the dome base surfaces 12A upon the pavement surface (best seen in FIG. 6). In the environmental context provided within FIG. 5, a curb cut 44 creates the transition point 42 at which it is necessary to provide a textured, tactile warning. When suitably positioned adjacent to the hazardous transition point, and trimmed to fit, heat is applied to partially melt the top layer 16. A simple torch may be used to supply the necessary heat. As the top layer 16 melts, it will flow into cracks, crevices, and pores of the pavement 40. Once it has been allowed to cool, it remains permanently attached to the pavement 40, and the domes 12 will provide tactile feedback to any pedestrian approaching the transition point 42.

Referring to FIG. 6, the substantially flat dome base surfaces 12A of each dome rest upon the pavement surface. The top layer 16 both covers and drapes downwardly over each of the domes 12 and then extends substantially coplanar with their base surfaces 12A, such that the top layer 16 can adhere to the pavement surface 40 and hold the domes 12 downwardly thereagainst.

FIGS. 7 thru 11 illustrate a second embodiment of the detectable warning carrier assembly 102. In the second embodiment, a base layer 14 is employed as the attachment layer—to both maintain the positioning of the domes 12 and to adhere to a recipient pavement surface.

Figure 7:
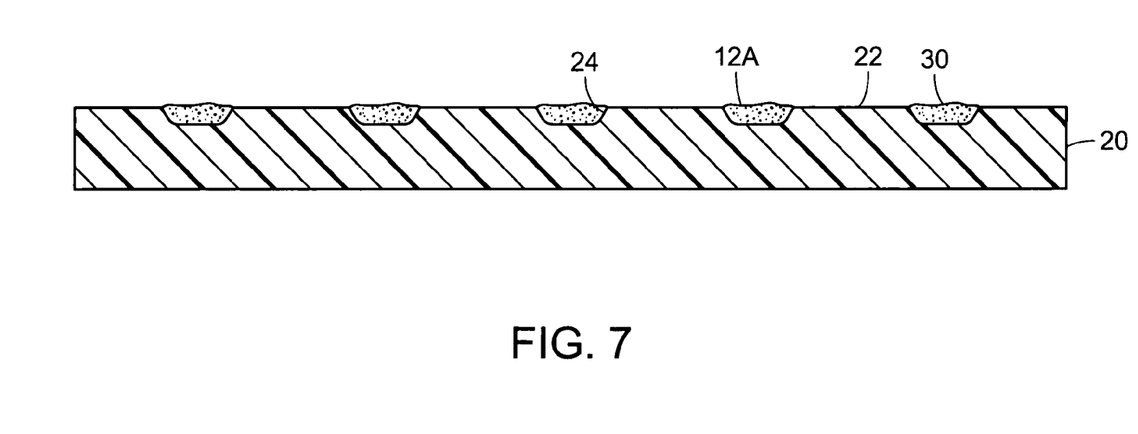
FIG. 7 is a cross sectional view of a mold used in the creation of a second embodiment of the detectable warning carrier assembly, wherein a heat resistant casting material has been introduced into the dome forming cavities.
Figure 8:
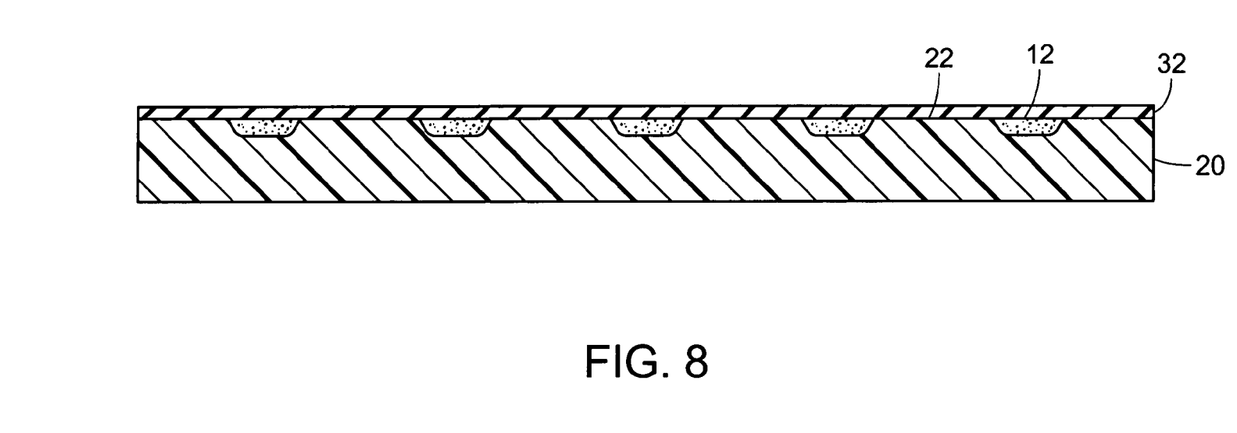
FIG. 8 is a cross sectional view of the second embodiment, wherein a sheet of thermoplastic material has covered the domes created within the dome forming cavities.
Figure 9:
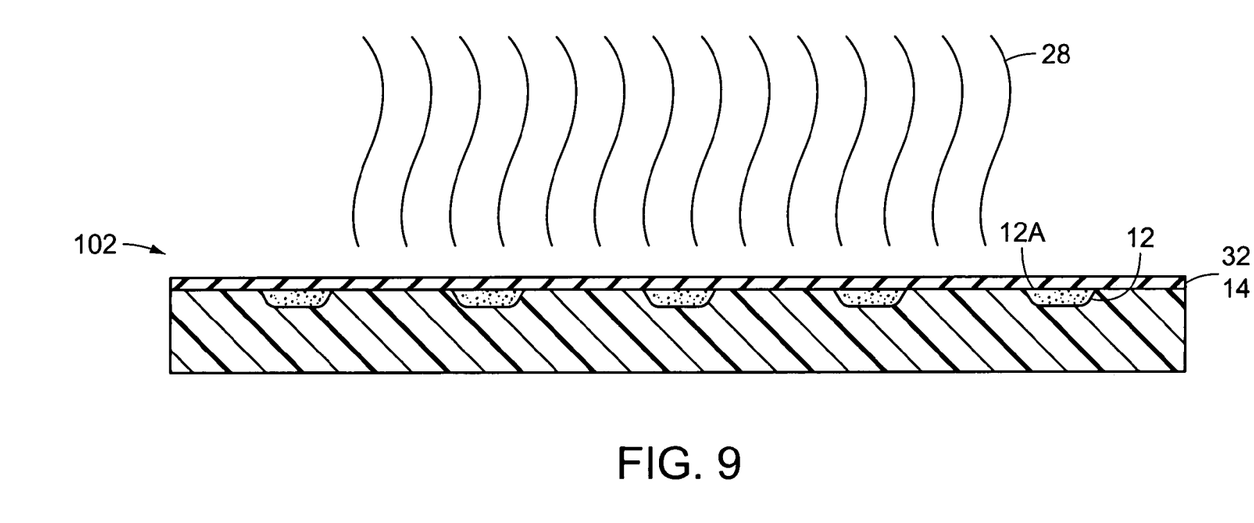
FIG. 9 is a cross sectional view of the second embodiment, wherein heat is applied to conform the thermoplastic materials to the domes and to adhere the thermoplastic material to the domes.

Formation of the second embodiment is illustrated in FIGS. 7 thru 9. In FIG. 7, the heat resistant casting material 30 has been added directly into the mold to partially fill the dome forming cavities 24 of the mold 20. In particular, the heat resistant casting material 30 is added until it substantially reaches the top surface 22 of the mold 20. What will become the dome base surfaces 12A are shown as uneven in an exaggerated sense to emphasize the flowability of the casting material. The dome base surfaces 12A are still, in fact, preferably somewhat uneven to facilitate secure attachment to the base layer 14 as will be illustrated hereinafter.

In FIG. 8 a second sheet of thermoplastic material 32 has been overlaid upon the mold, spanning the top surface thereof, to coat the detectable warning domes 12 and with a continuous piece of thermoplastic material to form the base layer 14. In particular, the second sheet of thermoplastic material 32 spans the mold 20, covers all the detectable warning domes 12 (inverted and within the dome forming cavities). Then in FIG. 9, heat 28 is applied to bring the second sheet of thermoplastic material 32 into a melted or plastic state so that it flows to adhere to the base surface 12A of the detectable warning domes 12. Thus, the second sheet of thermoplastic material 32 becomes the base layer 14 of the detectable warning carrier assembly 102. To facilitate the adhering to the base surface 12A, sand may be sprinkled over the domes 12, or other means employed to facilitate a secure joint between the domes 12 and base layer 14.

Figure 11:
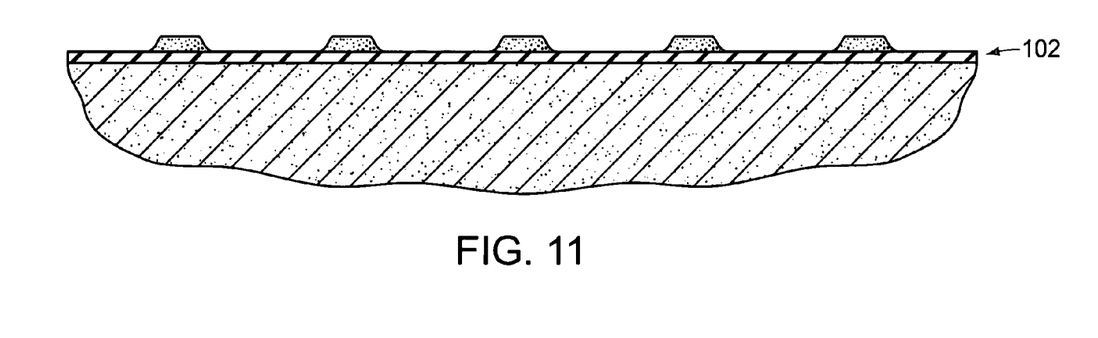
FIG. 11 is a cross sectional view, taken generally in the area of line 11—11 in FIG. 10, illustrating the base layer adhered to the pavement surface, with the domes exposed thereabove and held to the pavement surface with the base layer.

After cooling, the detectable warning carrier assembly 102 may be removed from the mold—by separating the base layer 14 from the mold. The carrier assembly 102 is then inverted. As seen in FIG. 11, when fabricated carefully, the base layer 14 is substantially planar, and the domes 12 are mounted thereon.

Figure 10:
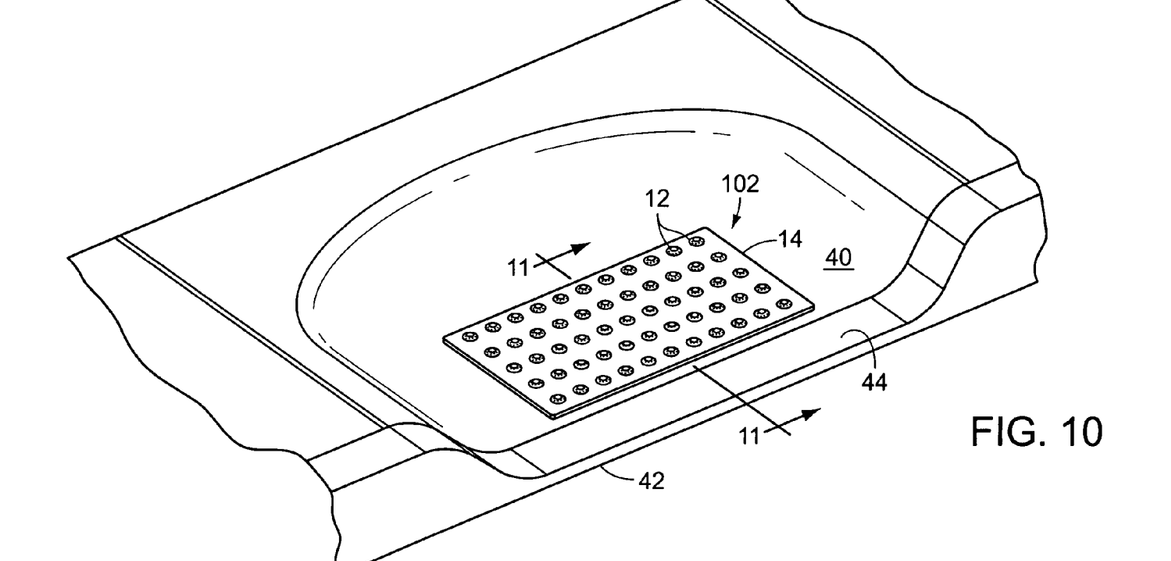
FIG. 10 is a diagrammatic perspective view, wherein the detectable warning carrier assembly of the second embodiment has been applied to the pavement surface.

Referring to FIG. 10, to install the second embodiment of the detectable warning carrier assembly 102, the base layer 14 is placed upon the pavement surface 40 near the hazardous transition point 42 created by the curb cut 44. When suitably positioned adjacent to the hazardous transition point, and trimmed to fit, heat is applied to partially melt the base layer 14. A simple torch may be used to supply the necessary heat. As the base layer 14 melts, it will flow into cracks, crevices, and pores of the pavement 40. Once it has been allowed to cool, it remains permanently attached to the pavement 40, and the domes 12 provide tactile feedback to any pedestrian approaching the transition point 42. The domes 12 are exposed above the base layer 14. As illustrated in FIG. 11, the base layer 14 rests upon the pavement surface 40 to which it is adhered, the domes 12 are themselves adhered to the base layer 14.

In conclusion, herein is presented a detectable warning system for use on a pavement surface. The invention is illustrated by example in the drawing figures, and throughout the written description. It should be understood that numerous variations are possible, while adhering to the inventive concept. Such variations are contemplated as being a part of the present invention.

What is claimed is:

1. A detectable warning system, for installation onto a pavement surface adjacent to a hazardous transition, comprising:
    an attachment layer made up of one of a base layer and a top layer, the attachment layer substantially planar and made of thermoplastic material;
    a plurality of domes made of a heat resistant material, the domes secured to the attachment layer and arranged in a grid thereupon, the carrier layer extending substantially planar between the domes, such that the attachment layer may be adhered to a pavement surface by applying heat thereto and the heat resistant material of the domes is unaffected by said heat.

2. The detectable warning system as recited in claim 1, wherein the heat resistant material is selected from the group consisting of concrete, temperature resistant plastic, and earthen materials.

3. The detectable warning system as recited in claim 2, wherein the domes each have a substantially flat base surface.

4. The detectable warning system as recited in claim 3, wherein the domes each have a truncated upper surface.

5. A detectable warning method, for providing a tactile warning upon a pavement surface, using a mold having a top surface and a plurality of dome creation cavities extending downwardly from the top surface, the dome creation cavities spaced apart from each other in a grid, comprising the steps of:
    creating a detachable warning carrier assembly by:
        covering the top surface of the mold with a first sheet of thermoplastic material,
        coating the top surface and the mold and the dome creation cavities with a conforming continuous top layer of thermoplastic material by applying heat to the first sheet of thermoplastic material, and
        creating a plurality of detectable warning domes by filling the dome creation cavities with a heat resistant material; and
    applying the top layer to the pavement surface.

6. The detectable warning method as recited in claim 5, wherein the step of applying the base layer to the pavement surface is preceded by the steps of separating the carrier from the mold, and inverting the detectable warning carrier assembly; and further comprises the steps of adhering the base layer to the pavement by heating the base layer.

7. The detectable warning method as recited in claim 5, wherein the step of applying the top layer to the pavement surface is preceded by the steps of separating the top layer from the mold, and inverting the detectable warning carrier assembly; and further comprises the steps of resting the domes upon the pavement and adhering the base layer to the pavement by heating the base layer.

8. The detectable warning method as recited in claim 7, wherein the step of filling the dome creation cavities with a heat resistant material further comprises introducing into the dome creation cavities a flowable but settable, heat resistant material to substantially the level of the top surface of the mold, and allowing the heat resistant casting material to harden.

9. The detectable warning method as recited in claim 7, wherein the step of applying the top layer to the pavement surface further comprises positioning the top layer adjacent to a hazardous transition.

10. The detectable warning method as recited in claim 7, wherein the step of filling the dome creation cavities with a heat resistant material further comprises introducing into the dome creation cavities a flowable but settable, heat resistant material to substantially the level of the top surface of the mold, and allowing the heat resistant casting material to harden.

11. The detectable warning method as recited in claim 7, wherein the step of applying the base layer to the pavement surface further comprises positioning the base layer adjacent to a hazardous transition.

12. The detectable warning method as recited in claim 8, wherein the heat resistant material is selected from the group consisting of concrete, earthen materials, and heat resistant plastic.

13. The detectable warning method as recited in claim 8, wherein the heat resistant material is selected from the group consisting of concrete, earthen materials, and heat resistant plastic.

14. The detectable warning method as recited in claim 13, wherein the step of applying the top layer to the pavement surface further comprises positioning the top layer adjacent to a hazardous transition.

15. The detectable warning method as recited in claim 13, wherein the step of applying the base layer to the pavement surface further comprises positioning the base layer adjacent to a hazardous transition.

16. A detectable warning method, for providing a tactile warning upon a pavement surface, using a mold having a top surface and a plurality of dome creation cavities extending downwardly from the top surface, the dome creation cavities spaced apart from each other in a grid, comprising the steps of:

creating a detachable warning carrier assembly by:
creating a plurality of detectable warning domes by filling the dome creation cavities with a heat resistant material, and
coating the detectable warning domes with a base layer of thermoplastic by fully covering the base layer and detectable warning domes with a sheet of thermoplastic material and applying heat to said sheet of thermoplastic material; and applying the base layer to the pavement surface.

\* \* \* \* \*